United States Patent
Nevis

Patent Number: 6,108,457
Date of Patent: Aug. 22, 2000

[54] BACKGROUND EQUALIZATION FOR LASER LINE SCAN DATA

[75] Inventor: Andrew J. Nevis, Panama City, Fla.

[73] Assignee: The United States of America as represented by the Secretary of the Navy, Washington, D.C.

[21] Appl. No.: 09/066,793

[22] Filed: Apr. 27, 1998

[51] Int. Cl.[7] .............................. G06T 5/00; G06T 5/40; G06T 5/50

[52] U.S. Cl. .......................... 382/274; 382/275; 382/168; 382/312

[58] Field of Search .................................. 382/254, 274, 382/168, 275, 169, 100, 312

[56] References Cited

U.S. PATENT DOCUMENTS 5,983,120  11/1999  Groner et al. ........................... 382/134
5,995,656  11/1999  Kim ........................................ 382/169

Primary Examiner—Scott Rogers
Attorney, Agent, or Firm—Harvey A. Gilbert; Donald G. Peck

[57] ABSTRACT

A method of and sensor for processing a laser line scan image to enhance the portion representing otherwise obscure objects from background. Two contrast enhancement routines are applied to enhance obscured objects in the low signal strength regions. One is a background equalization routine employing an overlapping piecewise least squares error technique that equalizes the high/low signal strength regions. The second is a local histogram clipping routine that applies a moving window histogram clip to enhance details in the low strength regions without effecting the high strength regions.

9 Claims, 1 Drawing Sheet

BACKGROUND EQUALIZATION FOR LASER LINE SCAN DATA

RELATED APPLICATIONS

This application is related to and incorporates herein U.S. patent application Ser. No. 09/066,707 entitled *Line Contrast Difference Effect Correction for Laser Line Scan Data* by A. J. Nevis and G. J. Dobeck.

TECHNICAL FIELD

The present invention pertains to the processing of laser line scan images obtained from a variety of different applications, such as underwater object detection. In particular, the present invention is directed to the correction of wide variations in the strength of background signals to further enhance the image provided by laser line scan sensors.

BACKGROUND OF INVENTION

Laser line scan imagery has been found to have fluctuating brightness (contrast) regions due to high/low signal strengths when scanning data. High signal strength regions occur when the laser line scan sensor is perpendicular to a reflective surface (i.e. a sea bottom), where photons travel the shortest distance resulting in less scattering effects. Low signal strength regions occur at scan line off-angles and sudden drops of elevations in the reflective surface, where photons must travel longer resulting in more scattering effects. The low signal strength regions can limit the visibility of image details, allowing objects to "hide" within image "shadows". Consequently, greater contrast in the image is often required.

Typical contrast enhancement routines have difficulties enhancing the laser line scan images. This is because contrast enhancements are designed to enhance either low contrast regions or high contrast regions, but not both. Thus low contrast enhancement routines can be used to enhance the low signal strength regions, but not without deleterious effects to objects already visible in the high signal strength regions. Also, most contrast enhancement routines are pixel-based (such as a log scale enhancement) and cannot enhance local spatial variations such as the high/low signal fluctuations found in laser line scan data.

Histogram clipping, another commonly utilized enhancement technique, is also ineffective in enhancing laser line scan images. This is because histogram clipping enhances by removing noise pixels at the upper and lower ends of the image dynamic range. However, the high/low signal strength regions containing desired information about an image generally lie away from the extreme ends of the image dynamic range. Thus, since the separation between high and low signal strength regions within the image does not change, histogram clipping cannot effectively enhance information in the low signal strength regions which are suppressed by the high signal strength regions.

A least squares error method to estimate an image background as a means of image enhancement has been used before in the image art. In particular, a two-dimensional least squares error method to remove background "tilt" has been used before on laser line scan (LLS) data. However, this background estimate results in a planar surface which cannot equalize the "local"high/low intensity variations found in the laser line scan data.

The aforementioned two-dimensional method was first proposed by Dave Brown at Penn State University/Applied Research Laboratories in a report entitled *Status Report: Electro-Optic Image Processing/Analysis*, incorporated herein by reference to provide any necessary elaboration on the least squares error method. A modified version of this technique uses a one-dimensional least squares error method down to image columns and rows of a pixel array and is disclosed in the publication entitled *Image Characterization of Target Recognition in the Surf Zone Environment*, CSS/TR-96/19 by Andrew Nevis (the inventor of the present application), and is incorporated herein by reference. However, this technique cannot accurately estimate local intensity variations. Consequently, conventional LLS sensors do not operate at optimum theoretical efficiency, and this characterization imposes severe limitations on such devices as underwater sensors.

SUMMARY OF INVENTION

Consequently, it is an object of the present invention to provide a method for processing a laser line scan image so that non-uniform signal strength regions are equalized.

Another object of the present invention is to provide a method for processing a LLS image so that information in low signal strength regions can be enhanced without detrimental effects to objects already visible in high signal strength regions.

It is still a further object of the present invention to provide a method for processing a LLS image in which local spacial information is used for effective enhancement of different low contrast regions having varying intensity levels throughout an image.

It is an additional object of the present invention to provide a method for processing a LLS image in which the background equalization routine acts as a high-pass filter to thereby "sharpen" objects detected when background equalization occurs.

These and other objects and advantages of the present invention are achieved by a method for processing a LLS image in which an image is input and line contrast difference correction is applied. Once the image has been corrected by that process, a $\log_{10}$ scale routine is applied to help enhance the low signal strength regions. In order to remove high/low intensity variations, thereby making the image more uniform, an estimate of the image background along the image columns is made. Next, from the column background estimate, an estimate of the background is made along the image rows. Both of these estimates are carried out using a linear least squares error method employing overlapping piece-wise line segments. Then the image is equalized by subtracting the background estimate from it and rescaling the image to fill dynamic range. A histogram clipping routine is applied to remove random noise, and the resulting corrected image is saved to an output file for storage or display.

DETAILED DESCRIPTION OF THE PREFERRED EMBODIMENTS

Figure 1:
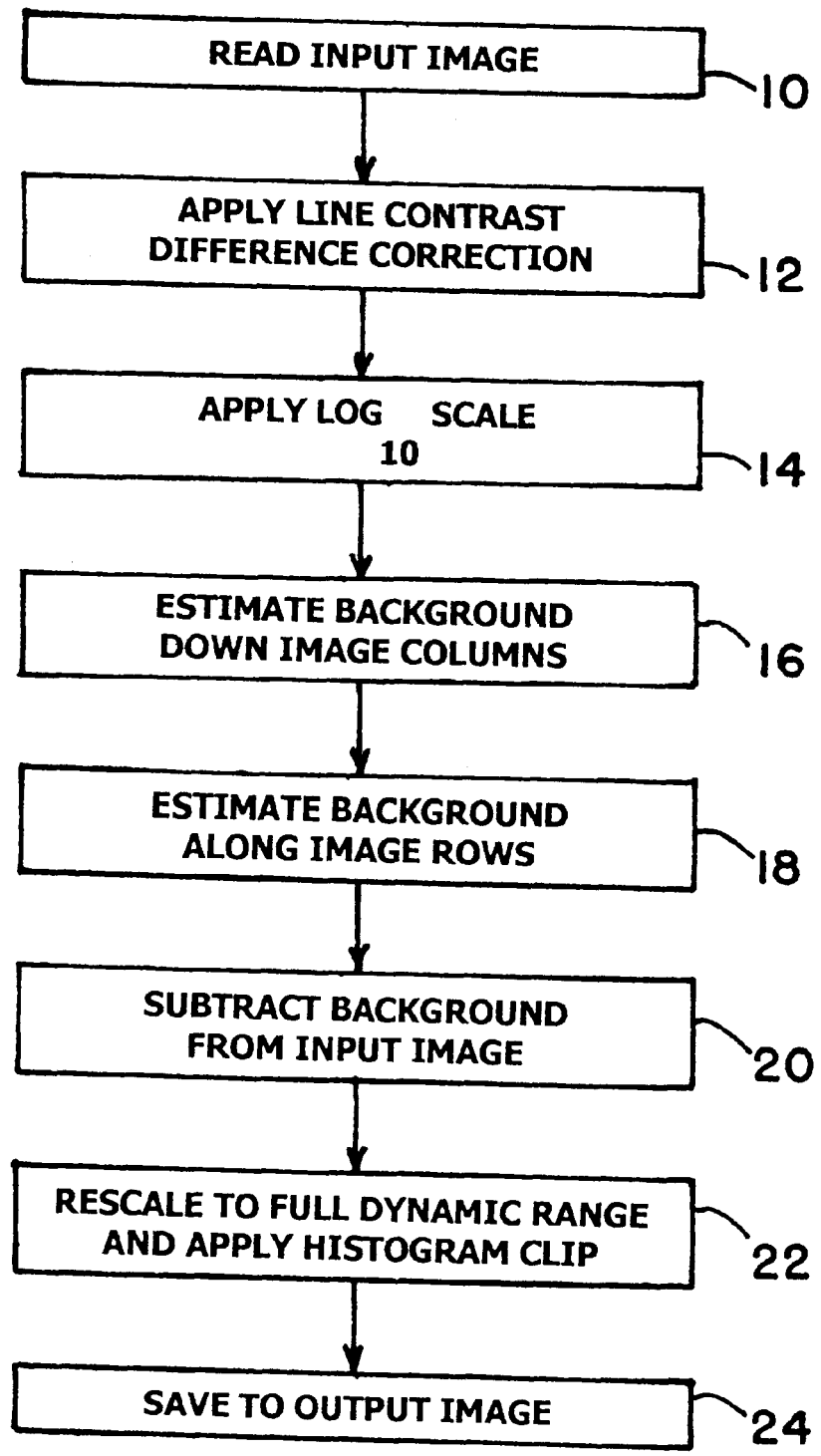
FIG. 1 is a flow diagram depicting the method of the present invention.

FIG. 1 depicts the logic of a FORTRAN program that is directed to equalizing non-uniform signal strength regions found in image matrices produced from laser line scan data. The program can, of course, be written in any one of a number of programming languages available at any point in time.

The overall background equalization technique of the present invention was first disclosed in a CSS document entitled *Local Contrast Enhancement for Electro-Optic Data*, incorporated herein in the Appendix to the present application, by Andrew Nevis, the inventor of the present application. Further background for the present invention is found in the following documents: *Image Enhancement For Mine Identification*, by A. J. Nevis and G. J. Dobeck, CSS TR-94/45; *Low Contrast Enhancement for Electro-Optic Data* by A. J. Nevis, CSS TR-96/52; *Image Characterization and Target Recognition in the Surf Zone Environment* by A. J. Nevis, CSS TR-96/19, all incorporated herein by reference.

At step 10, as depicted in FIG. 1, an image is scanned by a laser line scan (LLS) sensor. The techniques for doing this are well known and described in the conventional art, and further elaborated upon in the previously cited documents. At step 12, line contrast difference effect correction is applied to the image input at step 10.

This process is fully disclosed in related patent application Ser. No. 09/066,707, entitled *Line Contrast Difference Effect Correction for Laser Line Scan Data* by A. J. Nevis and G. J. Dobeck. The full text disclosing this technique has not been included in the text of the instant application for the sake of brevity and clarity in comprehending the present invention. It is sufficient to understand that the line contrast difference effect has been corrected before the next step of the process of the present invention is carried out.

At step 14 it is necessary to apply a $\log_{10}$ scale routine to help enhance the low signal strength regions using the following relationship:

$$I_{ij} * (\log_{10}[I_{ij}/I_{max} * (10^P - 1) + 1])/p$$

where $I_{ij}$ is a pixel in input image I, $I_{max}$ is the maximum value of the image dynamic range, and p=2.

Since it is the objects obscured in the weak signal regions (low contrast regions) that are of interest, the $\log_{10}$ scale routine is applied to the image at the beginning of the algorithm before equalizing the background.

In step 16 the image background down the image columns is estimated. Use an overlapping piece-wise least squares error with line segments 256 pixels long for each image column. Each line segment is approximated with a least squares error estimate. The least squares error estimate uses piecewise linear line segments to allow for more flexibility in changing regions of the background, while an overlapping technique was used to help reduce edge effects where the line segments connect.

To estimate the background for input image $I_{ij}$ each column i is modeled by $$I_{ij} = [I_i(j)]_1 + \ldots + [I_i(j)]2_k$$

and, $$[I_i(j)]_k = c_{1ik} j = c_{2ik} j = 1, \ldots, N \text{ and } k=1, \ldots, K$$

where coefficients $c_{1ik}$ and $c_{2ik}$ are determined by a linear least squares error method, N is the length of the piecewise line segments, and K is the number of the piecewise line segments. The piecewise line segments are overlapped 50%, with the overlapping parts merged together linearly. Thus, the last N/2 pixels of line segment $[I_i(j)]_1$, and the first N/2 pixels of line segment $[I_i(j)]_2$ are merged together by the following relationship:

$$(1-wt)*[I_j(j)]_1 + wt*[I_j(j)]_2$$

where, $$wt = \left(j - \frac{N}{2}\right) \bigg/ (N/2) j = N/2, \ldots, N$$

The output of the column estimate is saved to the intermediate array $H_{ij}$.

The next step (18) is to estimate the background of the intermediate array $H_{ij}$ by repeating the same least squares error process on its rows and saving the output to background array $B_{ij}$. In this case, each row j is modeled by $$H_{ij} = [H_j(i)]_1 + H_J(i)_2 + \ldots + [H_j(i)]_K$$

and, $$[H_j(i)]_k + b_{1jk} + b_{2jk} \, i+1, \ldots, N \text{ and } k+1, \ldots, K$$

where again the coefficients $b_{1jk}$ and $b_{2jk}$ are determined by a linear least squares method, N is the length of the piecewise line segments, K is the number of piecewise line segments, and the line segments overlap linearly by 50%. By taking the least squares error estimate first on the image columns and then on the image rows, a 2-D background matrix ($B_{ij}$) is generated which is used to estimate the image background. The image is then equalized by subtracting the estimated image background $B_{ij}$.

The overlap of each least squares error line segment by 50% avoids edge effects where line segments connect. This is accomplished by a linear merge. For example, the last 128 pixels of line segment $L_1$ is linearly merged with the first 128 pixels of line $L_2$.

At step 20 the high/low signal strength variations are removed by subtracting the background estimate from the image (the image modified by step 14) on a pixel-by-pixel basis.

At step 22 the resultant image is rescaled to its full dynamic range. Also, the aforementioned process by itself (steps 16–20) has been found to generate some noise preventing full dynamic range of the output image. Thus, a histogram clip has been added at the end of the aforementioned algorithm to remove artifact noise. Final step is to stretch to full dynamic range.

At step 24 the modified image matrix is saved for either storage or display. The advantage of this process over typical contrast enhancement routines is that information in low signal strength regions can be enhanced without detrimental effects on objects already visible in high signal strength regions. Equalizing the high/low signal strength regions allows information in both regions to be visible simultaneously. Another advantage is that background equalization uses local spatial information for effective enhancement of differing low contrast regions having varying intensity levels throughout an image. Also, since the algorithm involves subtracting an image background, the background equalization routine acts similar to a high-pass filter in that the objects are displayed "sharpened" by the background equalization enhancement.

Although at least one embodiment has been described by way of example, the present invention should not be construed to being limited thereby. Rather, the present invention should be interpreted as including all variations, combinations, permutations, modifications and applications that would occur to a skilled practitioner having been taught the present invention. Therefore, the present invention should be limited only by the following claims.

I claim:

1. A method of operating an image sensor comprising:

(a) scanning to create an input image array;

(b) applying a $\log_{10}$ scale routine to enhance low strength regions of said image array provided by (a), thereby creating an enhanced image array;

(c) estimating background values of said enhanced image array along columns of said enhanced image array using an overlapping, piecewise, least squares error technique to create an intermediate array;

(d) estimating background values along rows of said intermediate array with overlapping piecewise LSE to create a background array;

(e) subtracting said background array from said enhanced image matrix to create a corrected image array;

(f) applying histogram clip and then rescaling said corrected image matrix to full dynamic range to create an equalized output image array.

2. The method of claim 1, wherein step (a) further includes the substep of applying a line contrast difference correction technique to said image matrix.

3. The method of claim 2, further comprising:

(g) saving said equalized output image array for storage or display.

4. The method of claim 3, wherein step (b) is carried out using the relationship $$I_{ij}*(log_{10}[I_{ij}/I_{max}*(10^P-1)+])/p$$

where $I_{ij}$ is a pixel in input image I, $I_{max}$ is the maximum value of the image dynamic range, and p=2.

5. The method of claim 4, wherein said overlapping piecewise least squares error technique of step (c) is carried out using line segments 256 pixels in length with adjoining line segments overlapped.

6. The method of claim 5 wherein said overlapping piecewise least squares error technique of step (d) is carried out using line segments 256 pixels in length with a 50% overlap with adjoining line segments.

7. The method of claim 3 wherein step (f) further includes the substep of applying a histogram clip to create said equalized output image array.

8. The method of claim 1 wherein said image sensor is a laser line scanning sensor.

9. A laser line scanning image sensor comprising:

(a) means for scanning to create an input image array;

(b) means for applying a $\log_{10}$ scale routine to enhance low strength regions of said image array provided by (a), creating an enhanced image array;

(c) means for estimating background values of said enhanced image array along columns of said enhanced image array using an overlapping, piecewise, least squares error technique to create an intermediate array;

(d) means for using overlapping piecewise LSE method for estimating background values along rows of said intermediate array to create a background array;

(e) means for subtracting said background array from said enhanced image matrix to create a corrected image array;

(f) means for applying histogram clip and then rescaling said corrected image matrix to full dynamic range to create an equalized output image array.

* * * * *